United States Patent [19]

Winzeler

[11] B 3,996,817
[45] Dec. 14, 1976

[54] TRANSMISSION INCLUDING DUAL INPUT CLUTCH ASSEMBLY

[75] Inventor: James Elmer Winzeler, East Peoria, Ill.

[73] Assignee: Caterpillar Tractor Co., Peoria, Ill.

[22] Filed: Aug. 27, 1974

[21] Appl. No.: 500,945

[44] Published under the second Trial Voluntary Protest Program on February 24, 1976 as document No. B 500,945.

[52] U.S. Cl. .................. 74/765; 74/764; 192/87.13

[51] Int. Cl.² .................. F16H 57/10; F16D 19/00

[58] Field of Search .......... 74/764, 765, 758, 759, 74/753; 192/48.91, 87.12, 87.13

[56] References Cited

UNITED STATES PATENTS

| | | | |
|---|---|---|---|
| 2,693,721 | 11/1954 | Forster | 74/759 X |
| 3,318,174 | 5/1967 | Clapp et al. | 74/753 |
| 3,486,398 | 12/1969 | Waclawek | 74/759 X |
| 3,575,067 | 4/1971 | Herman | 74/759 |
| 3,713,354 | 1/1973 | Edmunds | 74/753 X |
| 3,733,928 | 5/1973 | Uozumi et al. | 74/753 |
| 3,820,418 | 6/1974 | Ott | 74/759 |

FOREIGN PATENTS OR APPLICATIONS

545,064  8/1957  Canada .................. 74/765

*Primary Examiner*—Samuel Scott
*Assistant Examiner*—Parshotam S. Lall
*Attorney, Agent, or Firm*—Phillips, Moore, Weissenberger, Lempio & Strabala

[57] ABSTRACT

A transmission constructed according to the present invention includes a plurality of planetary gear sets, two inputs clutches being simultaneously engaged to establish an intermediate gear ratio within the transmission, each of the input clutches also being engaged together with additional friction devices in the transmission for establishing gear ratios either higher or lower than the intermediate gear ratio, the interconnection of the planetary gear units being selected for improved torque transmission, the input clutches being interrelated by means of a balancing mechanism to facilitate their operation either in unison or separately from each other.

5 Claims, 5 Drawing Figures

| SPEED RANGE | CLUTCHES ENGAGED |
|---|---|
| 1 - REV. | 34 & 37 |
| NEUTRAL | 37 |
| 1 - FWD | 32 & 37 |
| 2 - FWD | 32 & 36 |
| 3 - FWD | 32 & 34 |
| 4 - FWD | 32 & 33 |
| 5 - FWD | 34 & 33 |
| 6 - FWD | 36 & 33 |

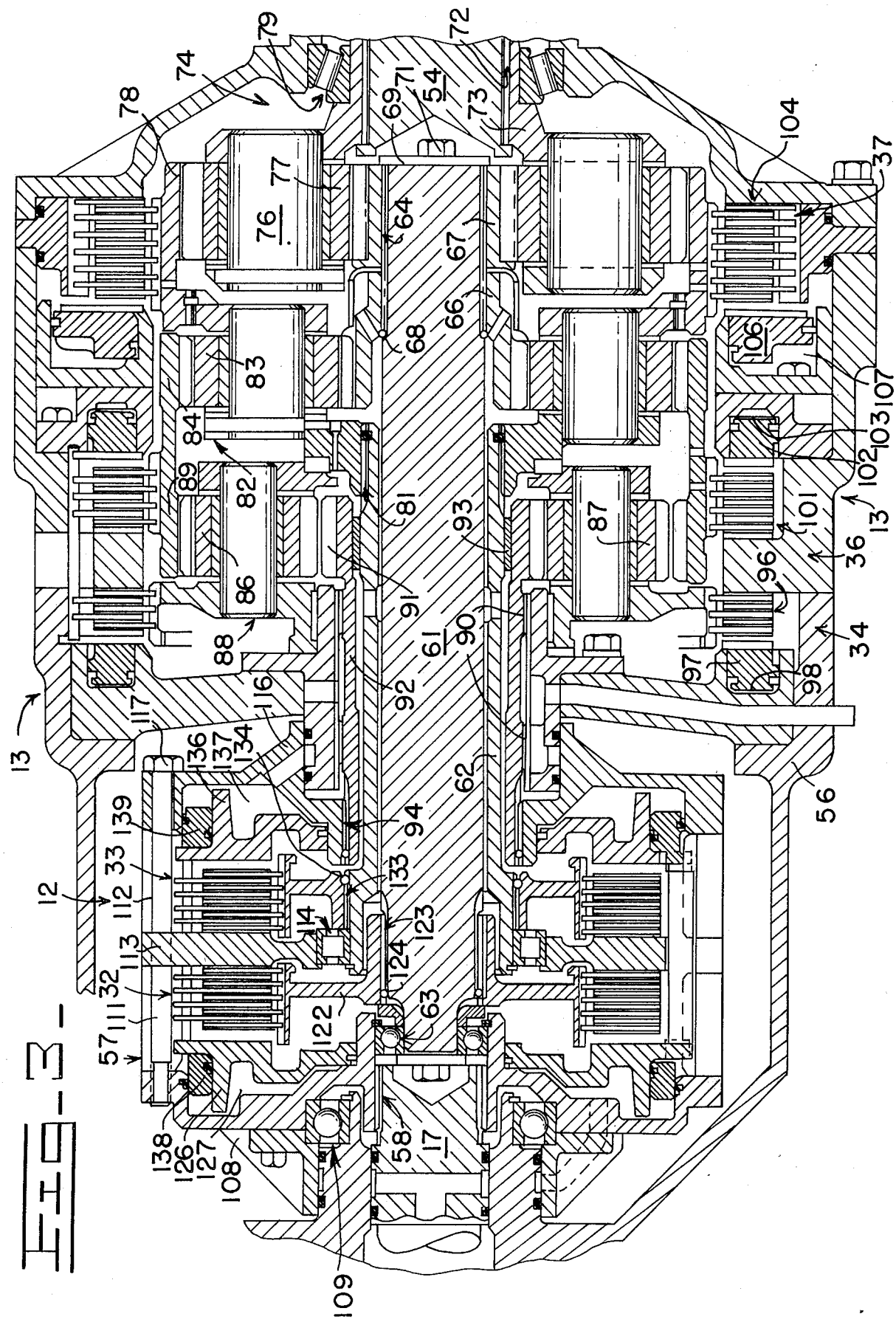

TRANSMISSION INCLUDING DUAL INPUT CLUTCH ASSEMBLY

BACKGROUND OF THE INVENTION

The present invention relates to a multispeed transmission for use in vehicles such as trucks. The transmission is particularly intended to provide a broad range of operating speed ratios while being designed to facilitate gear ratio changes within the transmission.

As will be made apparent in greater detail below, the transmission of the present invention is particularly contemplated as comprising a hydrodynamic torque converter providing a fluid coupling between a prime mover and a transmission speed ratio section.

The transmission speed ratio section may conventionally comprise a number of friction devices or brakes in order to establish a plurality of torque transmission paths therethrough. However, a preferred interconnection of the planetary gear sets within the transmission speed ratio section according to the invention is particularly intended to facilitate torque delivery through the transmission.

In addition, the invention is particularly directed toward a dual clutch assembly for selectively coupling an input shaft with various components in the transmission speed ratio section.

The prior art provides numerous illustrations of transmissions including a transmission speed ratio section generally of the type briefly described above. In view of the extensive prior art in this area, reference is particularly made only for purposes of example to U.S. Pat. Nos. 3,602,055; 3,678,784; 3,678,785; 3,653,118 and 3,705,521.

An additional specific feature of the present invention resides within a transmission of the type outlined above wherein a pair of input clutches may be engaged in unison to provide a selected intermediate gear ratio. Each of the two input clutches may then be separately engaged in combination with selected brakes or friction devices within the transmission speed ratio section to establish additional gear ratios either above or below the selected intermediate gear ratio.

A particular advantage realized from this combination resides in the design and operation of controls for both the input clutches and the friction devices within the transmission speed ratio section. Because of the arrangement described above, it is necessary only to disengage and reengage a single friction device in order to accomplish either an upshift of downshift between adjacent gear ratios within the transmission. This feature by itself is also contemplated in the prior art, for example noting the last patent cited above and also particularly noting U.S. Pat. No. 3,610,071. However, novel and advantageous operation of the present invention is achieved through design of the transmission wherein the two clutches are engaged in unison to establish an intermediate gear ratio. As will be apparent from the following description, this facilitates the design, construction and operation of a transmission having a broad range of operating speeds while particularly facilitating upshifting and downshifting between gear ratios.

In addition, the transmission of the present invention is designed to have a single friction device within the transmission speed ratio section engaged in order to establish a neutral condition within the transmission. The same friction device remains engaged in both first gear forward and first gear reverse. Initially, this feature facilitates shifting of the transmission in the same manner noted above since only a single friction device need be disengaged and a single friction device reengaged for an upshift or downshift between adjacent gears. Further, the single friction device within the transmission speed ratio section may be designed with sufficient torque capacity in order to accommodate torque converter stall in both first gear forward and reverse.

Additionally, as was also noted above, the present invention further contemplates a novel interconnection for a plurality of planetary gear sets within the transmission speed ratio section. The interconnection of these units is particularly intended to facilitate torque delivery through the transmission. Although this feature is intended for operation together with a dual input clutch assembly as described in greater detail below, it is also possible to employ the transmission speed ratio arrangement of the present invention in combination with other transmission input sections as well.

Additional advantages are realized within the present invention through the design of the transmission speed ratio section to provide a direct drive coupling between the transmission input and transmission output when the two input clutches are engaged in unison. The transmission speed ratio section is then capable of functioning in combination with engagement of one input clutch to provide relatively higher gear ratios (greater than 1.0) as suitable for low speed, high torque operation of the vehicle. The transmission speed ratio section is also adapted in combination with engagement with the other input clutch to establish a plurality of overdrive gears where the gear ratio is less then 1.0.

The dual input clutch assembly referred to above also comprises a particularly novel and useful portion of the present invention which may be used in a transmission of the type described above or in numerous other applications as well.

SUMMARY OF THE INVENTION

Accordingly, it is an object of the present invention to provide a transmission including a transmission speed ratio section in combination with a pair of input clutches which may be engaged in unison or separately from each other.

It is a further object of the invention to provide such a transmission wherein engagement of the two clutches in unison establishes an intermediate gear ratio.

It is another object of the invention to provide a transmission including a transmission speed ratio section comprising a plurality of planetary gear sets, the interconnection of the planetary gear sets functioning to facilitate torque delivery through the transmission when employed in combination with a suitable input unit by minimizing torque interruption during shifts between gear ratios.

It is yet another object of the invention to provide a transmission of the type referred to above wherein a dual input clutch unit is adapted to selectively interconnect a transmission input shaft with a transmission speed ratio section by means of first and second intermediate drive shafts.

It is a still further object of the invention to provide such a transmission including a dual input clutch assembly wherein engagement of the two input clutches in unison establishes a direct drive coupling between the transmission input shaft and the transmission output shaft.

Additionally, it is an object to provide a dual clutch assembly employable within a transmission of the type described above or in other applications wherein engagement of the clutches in unison or separately from each other is facilitated by means of a balance mechanism interconnecting the two clutch units.

Additional objects and advantages of the invention are made apparent in the following description having reference to the accompanying drawings.

DESCRIPTION OF THE DRAWINGS

FIG. 3 is a centrally sectioned view of the input clutch and transmission speed ratio sections of the transmission illustrated in FIG. 1.

DESCRIPTION OF THE PREFERRED EMBODIMENT

Figure 1:
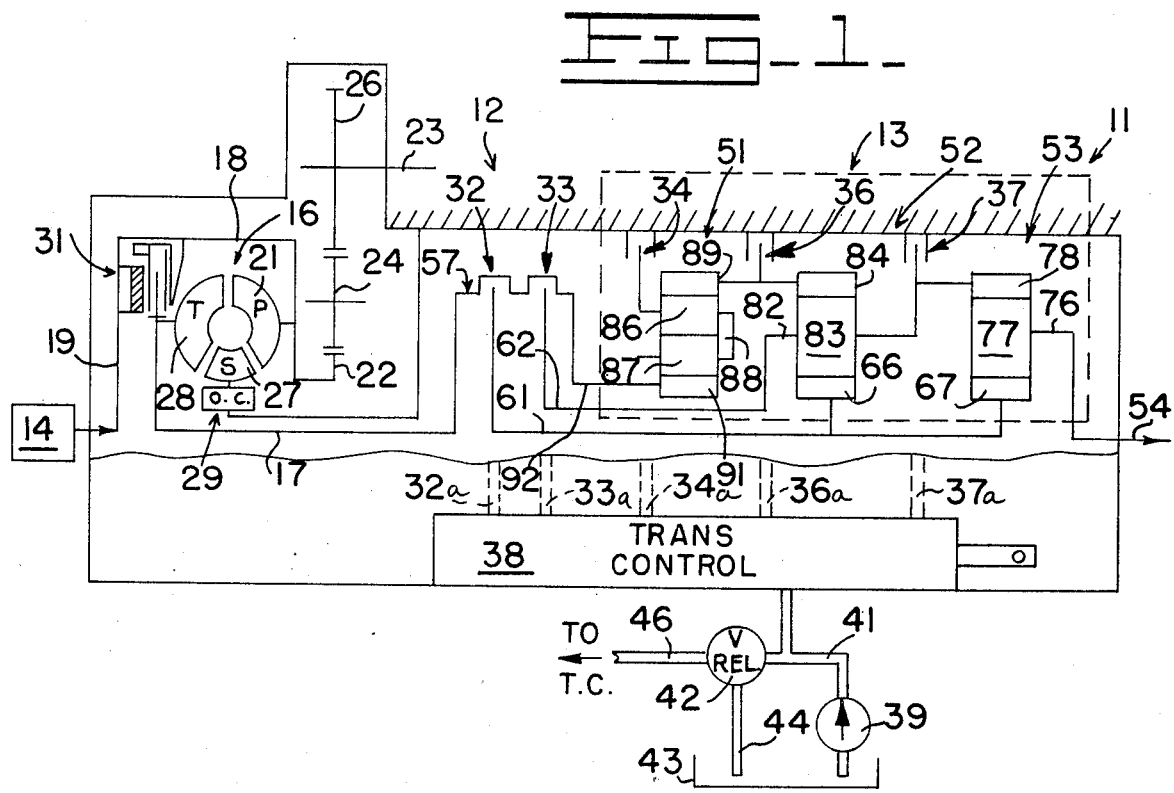
FIG. 1 is a schematic representation of a vehicular drive train including a transmission of the type contemplated by the present invention.

A transmission or drive train of the type indicated at 11 in FIG. 1 includes an input clutch assembly 12 and a transmission speed ratio section 13 which embody novel features of the present invention. In order to facilitate a better understanding of the invention, the drive train 11 is also illustrated as including a prime mover 14 and a torque converter 16 suitable for providing a fluid coupling between the prime mover 14 and an input shaft 17 for the transmission.

Although not a basic feature of the present invention, the torque converter is of a generally conventional type having a rotatable housing 18 coupled with the prime mover 14 through a suitable input member 19, preferably providing a flexible coupling. The rotatable housing 18 is directly connected with an impeller 21 of the torque converter and with a gear 22 which drives a power take-off shaft 23 through transfer gears 24 and 26.

The torque converter 16 also conventionally includes a reactor or stator member 27 and a turbine element 28 arranged within the housing 18 as well as an overrunning clutch 29 and a lock-up clutch 31. The overrunning clutch may conventionally be engaged to lock the stator 27 against rotation or be disengaged to permit free wheeling of the stator, for example, during high speed operation through the drive train.

The lock-up clutch 31 is also contemplated for operation in a generally conventional manner. for example, with the lock-up clutch 31 being disengaged, the torque converter 16 provides a fluid coupling between the prime mover 14 and the transmission input shaft 17. The lock-up clutch 31 may be selectively engaged to provide a direct drive coupling between the prime mover and the transmission input shaft 17 in order to provide more efficient operation at relatively high speeds.

During each speed change or shift between gear ratios, the lock-up clutch 31 may be disengaged so that the torque converter absorbs shock as the prime mover 14 again commences to transmit torque through the transmission. Generally, the torque converter 16 is employed when the input member 19 is being driven at relatively low speed and under relatively high torque by the prime mover 14. Both the lock-up clutch 31 and the overrunning clutch 29 may be responsive to rotating speed of a component within the drive train for establishing an engaged or disengaged condition.

Both the input clutch assembly 12 and the transmission speed ratio section 13 are described in greater detail below having reference to FIGS. 3 and 4. At this point, however, it is noted that those components include a number of friction devices which may be selectively actuated for establishing a suitable gear ratio and/or direction of travel for the transmission. The friction device includes hydraulically actuated input clutches 32 and 33 within the input clutch assembly 12. Additional friction devices are employed within the transmission speed ratio section 13 and preferably comprise the hydraulically actuated brakes indicated respectively at 34, 36 and 37.

Each of these friction devices may be selectively actuated or engaged by means of a single transmission control valve indicated at 38. The transmission control valve is in communication with each of the friction devices through corresponding conduits indicated respectively at 32a, 33a, 34a, 36a and 37a. Fluid under pressure is communicated to the transmission control valve 38 from a pump 39 through a conduit 41. Fluid pressure within the conduit 41 is regulated by a relief valve 42 which returns excess fluid to the drain or sump 43 through another conduit 44. The pump 39 may also be employed, for example, to communicate fluid under pressure to the torque converter 16 through a conduit indicated at 46.

The transmission speed ratios section 13 also includes a plurality of planetary gear sets indicated respectively at 51, 52 and 53. The planetary gear sets 51–53 are preferably interconnected in a manner described in greater detail below in order to provide a plurality of torque transmission paths to a transmission output shaft indicated at 54.

Components within the input clutch assembly 12 and the transmission speed ratio section 13 are described below with particular reference to FIGS. 3 and 4 which will better facilitate an understanding of the construction and mode of operation for those units. However, the numerals employed for the various components of the input clutch assembly 12 and transmission speed ratio section 13, as best seen in FIGS. 3 and 4, are also applied to schematic portions of FIGS. 1 and 5 in order to facilitate an understanding as to the interconnection between the planetary gear sets 51–53 and the plurality of torque transmitting paths established by selective engagement of the friction devices 32–37.

Referring now to FIG. 3, components of the input clutch assembly 12 and the transmission speed section 13 are illustrated within a stationary transmission housing 56. The transmission input shaft 17 is partially illustrated at the left side of the input clutch assembly 12 as viewed in FIG. 3. The input shaft 17 is coupled with a rotatable housing assembly 57 for the input clutch assembly 12 by means of a spline connection indicated at 58.

The rotatable housing assembly 57 contains the input clutches 32 and 33 which may be respectively engaged for coupling the rotatable housing 57 with a first intermediate drive shaft indicated at 61 and a second intermediate drive shaft 62 which is coaxially arranged about the first shaft 61. The remaining components within the input clutch assembly 12 may be best seen in FIG. 4 and accordingly described in greater detail below in connection with that figure.

The intermediate shafts 61 and 62 extend rightwardly into the transmission speed ratio section 13. The first intermediate drive shaft 61 is supported at its left end by means of a bearing indicated at 63 which is arranged within the input clutch assembly 12. The right end of the first intermediate shaft 61 is splined as indicated at 64 to receive sun gears 66 and 67 for the planetary gear sets 52 and 53 respectively. The sun gears 66 and 67 are positioned upon the shaft 61 by means of a retaining ring 68 and a thrust plate 69 which is fixed upon the end of the shaft 61 by a cap screw 71.

The transmission output shaft 54 is illustrated at the right end of FIG. 3 and is formed with a spline 72 to support an output carrier hub 73 of an output assembly 74. The output assembly 74 also includes the carrier member 76 for the third planetary gear unit 53. The carrier 76 rotatably supports the planetary gear means or planet gears 77 which are arranged in intermeshing relation between the sun gear 67 and the ring gear 78 for the third planetary gear set.

The entire output assembly 74 is supported by means of a bearing 79 upon the stationary housing 56.

The right end of the second intermediate drive shaft 62 is also formed with splines indicated at 81 to receive the carrier assembly 82 for the second planetary gear set 52. The carrier assembly 82 also rotatably supports planet gears 83 arranged in intermeshing relationship between the sun gear 66 and a ring gear 84 for the second planetary gear set 52.

From the above description, it may be seen that the second and third planetary gear sets 52 and 53 comprise simple planetary gear units having single pinions or carriers 82 and 76 respectively. The first planetary gear set 51, on the other hand, is of a compound type and has compound planet gears 86 and 87 supported by a common carrier assembly 88. A ring gear 89 for the first planetary gear set 51 may be secured to or integrally formed with the ring gear 84 for the second planetary gear set 52.

The sun gear 91 for the first planetary gear set 51 is rigidly secured to a tubular member 92 which extends leftwardly into the input drive assembly 12. The right end of the tubular member 92 is supported by means of two bearings 90 in the stationary housing 56 and the second intermediate drive shaft 62 is supported by means of a bearing indicated at 93. The left end of the tubular member 92 is secured for rotation with the rotatable input clutch housing assembly 57 by means of a spline connection indicated at 94.

Finally, in connection with the transmission speed ratio section 13, it was noted above that brakes 34, 36 and 37 are selectively actuated to secure various components within the three planetary gear sets against rotation. The brake 34 includes interleaved friction discs 96 secured respectively to the stationary housing 56 and the carrier assembly 88 for the first planetary gear set. The interleaved discs 96 are engaged by movement of a piston 97 in response to fluid pressurization within an actuating chamber 98. The actuating chamber 98 is of course in communication with the conduit 34a from the transmission control valve 38 (See FIG. 1).

The brake 36 similarly includes a plurality of interleaved friction discs 101 secured respectively to the stationary housing 56 and the connected ring gears 89 and 84 for the first and second planetary gear sets 51 and 52. The interleaved discs 101 are similarly engaged by movement of a piston 102 in response to fluid pressurization of an actuating chamber indicated at 103. The actuating chamber 103 for the brake 36 is in communication with the conduit 36a for the transmission control valve 38.

Finally, the brake 37 includes a plurality of interleaved friction discs 104 which are also alternately coupled with the stationary housing 56 on the one hand and the carrier assembly 82 for the second planetary gear set 52 and the ring gear 78 for the third planetary gear set 53 on the other hand.

The interleaved friction discs 104 are engaged by movement of a piston 106 in response to fluid pressurization within an actuating chamber 107. The chamber 107 is in communication with the conduit 37a from the transmission control valve 38 in FIG. 1.

Figure 4:
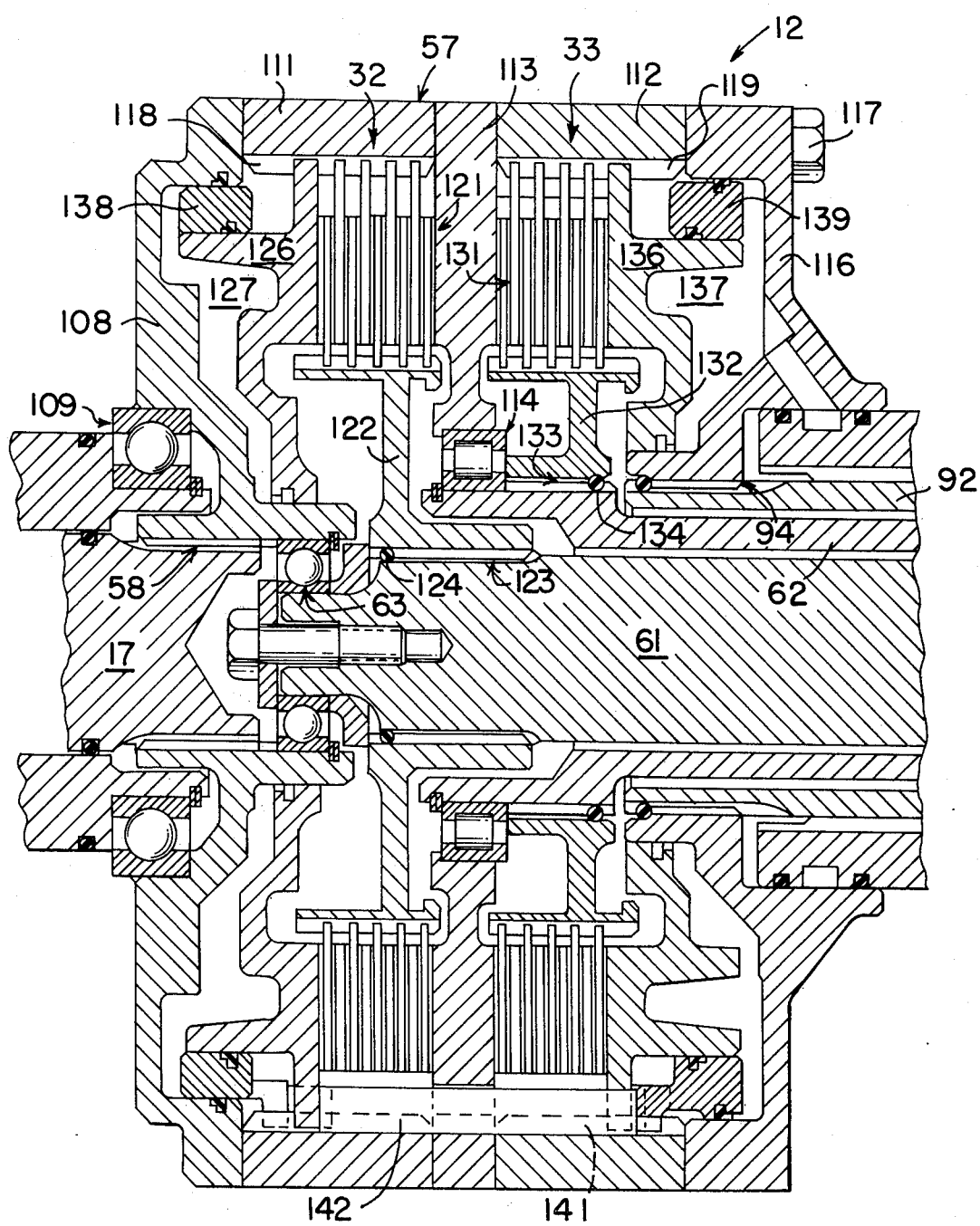
FIG. 4 is an enlarged centrally sectioned view of the input clutch assembly for the transmission.

Returning again to the input clutch assembly 12 as best seen in FIG. 4, the rotatable housing assembly 57 includes an input member 108 which is secured to the transmission shaft 17 by means of the spline 58 and supported for rotation by means of a bearing assembly indicated at 109. The rotatable housing assembly 57 also includes casing members 111 and 112 which respectively surround the input clutch units 32 and 33. An annularly formed member 113 extends radially inwardly from the rotatable housing assembly 57 to divide the input clutch units. The annular member 113 also provides support for the left end of the second intermediate drive shaft 62 by means of a roller bearing assembly indicated at 14. The rotatable housing assembly 57 also includes a housing output member 116 which is coupled with the tube 92 by means of the spline connection 44. The various components of the rotatable housing assembly indicated respectively at 108, 111, 113, 112 and 116 are secured together by means of cap screws such as that indicated at 117.

The casing members 111 and 112 are formed with internal splines as indicated respectively at 118 and 119. The input clutch 32 comprises a plurality of interleaved friction discs 121 secured respectively to the clutch hub 122 and to a spline 118. The clutch hub 122 is coupled with the first intermediate drive shaft 61 by means of a spline connection indicated at 123. The hub 122 is axially positioned upon the splined drive shaft 61 by means of a retaining ring indicated at 124.

The plurality of interleaved friction discs 121 are urged into engagement by rightward movement of a main piston 126 in response to fluid pressurization within an actuating chamber indicated at 127. The actuating chamber 127 is in communication with the conduit 32a from the transmission control valve 38 (See FIG. 1).

The second input clutch assembly 33 similarly includes a plurality of interleaved friction discs 131 alternately secured to the clutch hub 132 and the splines 119. The clutch hub 132 is secured for rotation with the second intermediate drive shaft 62 by means of a spline connection indicated at 133. The clutch hub 132 is axially located upon the splined shaft 62 by means of a retaining ring 134 and the roller bearing assembly 114. The interleaved friction discs 131 are urged into engagement with each other by leftward movement of a main piston 136 in response to fluid pressurization of an actuating chamber 137. The actuating chamber 137 is in communication with the conduit 33a from the transmission control valve 38 (See FIG. 1).

Within the operating description of the transmission as set forth below, it will be apparent that the input clutch assemblies 32 and 33 are designed for actuation both in unison with each other and separately from each other.

In order to facilitate the shifting of gears within the transmission and minimize torque interruptions, it is contemplated that each of the actuating chambers 127 and 137 be maintained full of hydraulic fluid. Thus, either of the clutches may be engaged within a very short time by pressurization of the appropriate actuating chamber without an accompanying delay necessary to first fill that chamber.

Such a procedure raises a problem in that centrifugal force developed within one of the chambers may tend to cause engagement of its clutch at an inappropriate time. For that purpose, a balancing mechanism is provided between the two input clutch assemblies. In addition, the balancing mechanism insures proper timing for engagement of the two clutches 32 and 33.

The balancing mechanism includes a small secondary piston arranged in a radially outer portion of each of the actuating chambers 127 and 137. These secondary pistons are indicated at 138 and 139. The secondary piston 138 is urged rightwardly by fluid pressurization of the actuating chamber 127 while the secondary piston 139 is urged leftwardly by fluid pressurization of the actuating chamber 137. The secondary piston 138 is mechanically coupled with the main piston 136 in the other actuating chamber 137 by means of circumferentially spaced and axially extending pins, one of which is indicated at 141. The pins 141 are arranged for direct mechanical interaction between the secondary piston 138 in the actuating chamber 127 and the main piston 136 which is designed for actuating engagement of the other input clutch assembly 33. Similarly, the secondary piston 139 within the actuating chamber 137 is mechanically coupled or interconnected with the main piston 126 associated with the first input clutch assembly 32 by means of circumferentially spaced and axially extending pins 142. Referring to the bottom of FIG. 4, it may be seen that the pins 142 are arranged for direct mechanical interaction between the secondary piston 139 and the main piston 126 which is designed for actuating engagement of the first input clutch assembly 32.

SUMMARY OF TRANSMISSION COMPONENTS

Figure 5:
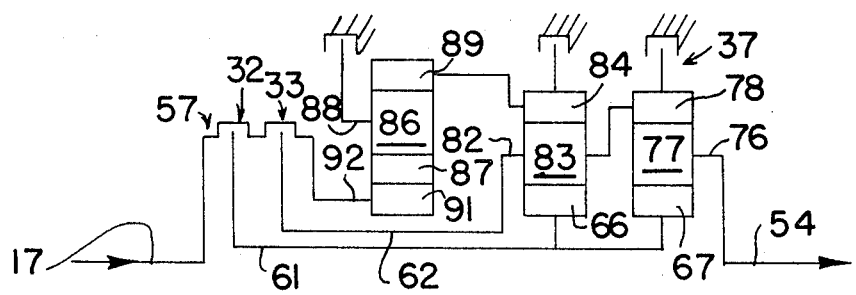
FIG. 5 is a simplified, schematic representation of the input clutch and transmission feed ratio speed ratio sections for the transmission of FIG. 1.

Referring now particularly to FIGS. 1 and 5, it may be seen that the input clutches 32 and 33 are respectively actuatable to provide a coupling for the input shaft 17 with the first and second intermediate shafts 61 and 62. The transmission input shaft 17 is always secured in driving relation with the sun gear 91 of the first planetary gear set through the rotatable clutch housing assembly 57.

The first intermediate drive shaft 61 is coupled to drive the sun gears 66 and 67 respectively for the second and third planetary gear sets 52 and 53. The second intermediate drive shaft 62 is secured to the carrier assembly 82 for the second planetary gear set 52. The carrier assembly 82 is permanently secured for rotation with the ring gear 78 of the third planetary gear set 53. The carrier assembly 76 for the third planetary gear set 53 also provides a direct drive coupling for the transmission output shaft 54.

The first brake 34 within the transmission speed ratio section 13 is actuated to lock the carrier assembly 88 for the first planetary gear set 51 against rotation. Similarly, the second brake 36 is selectively actuated to lock both of the ring gears 89 and 84 for the first and second planetary gear sets against rotation. Finally, selective actuation of the third brake 37 serves to lock the clutch hub 132 for the input clutch 33, the carrier assembly 82 for the second planetary gear set 52 and the ring gear 78 for the third planetary gear set 53 against rotation.

Before proceeding with an operational description of the transmission, it is noted that the relative size and number of teeth for the various components within the transmission speed ratio 13 may be selected depending upon the particular application for the transmission. For purposes of example, the number of teeth within main components of the transmission speed ratio section are set forth herein in order to generally indicate the division of torque throughout the transmission speed ratio section. Initially, each of the ring gears 89, 84, and 78 for the first, second and third planetary gear sets has a total of 68 teeth. The compound planet gears 86 and 87 for the first planetary gear set 51 each have a total of 17 teeth. The sun gear 91 for the first planetary gear set 51 includes 29 teeth. The planet gears 83 for the second planetary gear set 52 each have a total of 22 teeth while the sun gear 66 for the second planetary gear set 52 has 24 teeth. Finally, the planet gears 77 for the third planetary gear set 53 each as a total of 24 teeth while the sun gear 67 for that planetary gear set has a total of 20 teeth.

OPERATING DESCRIPTION

It is believed that the mode of operation for the present invention will be obvious from the preceding description, particularly for the input clutch assembly 12 and the transmission speed ratio section 13. However, operation of those components to establish a number of gear ratios within the transmission is set forth in detail below.

Initially, it has been noted that a particular purpose of the present invention is to provide an intermediate gear ratio when both of the input clutches 32 and 33 are engaged. It may be seen from the chart of FIG. 2 that those clutches are engaged to establish fourth gear forward. The first input clutch 32 also remains engaged for each of the higher gear ratios providing the lower drive speeds for the transmissions. Those operating speeds are indicated as first gear forward through third gear forward. Similarly, the second input clutch 33 remains engaged in the higher speed settings of fifth gear forward and sixth gear forward.

Figure 2:
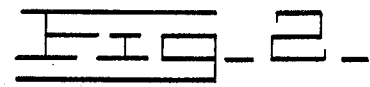
FIG. 2 illustrates a table setting forth the combination of clutches to be engaged for establishing forward, neutral and reverse gears within the transmission of FIG. 1.

It may be further noted from FIG. 2 that the single brake 37 remains engaged to establish a neutral condition within the transmission speed ratio section 13. That brake also remains engaged in both first speed forward and first speed reverse. Accordingly, the single brake 37 may be provided with sufficient torque capacity to resist or withstand converter stall conditions in both of these gears.

When the transmission is shifted from neutral into first gear forward, the brake 37 remains engaged and the first input clutch 32 is engaged by pressurization of its actuating chamber 127 (See FIG. 4). With those friction devices being engaged, the carrier assembly 82 for the second planetary gear set, the clutch hub 132 for the input clutch 33, and the ring gear 78 for the third planetary gear set 53 are locked against rotation. Similarly, when the first input clutch 32 is engaged, the transmission input shaft 17 is directly coupled with the sun gears 66 and 67 for the second and third planetary gear sets. Under these conditions, a single torque transmission pass is provided through the first intermediate drive shaft 61 and the third planetary gear set 53. With the ring gear 78 being grounded, rotation of the sun gear 67 causes rotation of the carrier assembly 76 which is transferred directly to the transmission output shaft 54.

When the transmission is shifted from first gear forward to second gear forward, the first input clutch 32 remains engaged, the brake 37 is disengaged and the brake 36 is simultaneously engaged. Accordingly, the ring gears 89 and 84 for the first and second planetary gear sets are locked against rotation.

Under these conditions, a split torque transmission path is provided from the first intermediate drive shaft 61 by means of the second and third planetary gear sets. With the ring gear 84 being grounded, rotation of the sun gear 66 causes rotation of the carrier assembly 82 which is transferred to the ring gear 78 for the third planetary gear set. Accordingly, both the ring gear 78 and the sun gear 67 for the third planetary gear set are driven in rotation with resultant rotation of the carrier assembly 76 being transferred directly to the transmission output shaft 54.

When the transmission is shifted from second speed forward to third speed forward, the first input clutch 32 again remains engaged, the brake 36 is disengaged and the brake 34 is engaged. Accordingly, only the carrier assembly 88 for the first planetary gear set is locked against rotation.

Under these conditions, input torque from the first intermediate drive 61 is again delivered directly to the sun gear 66 and 67 for the second and third planetary gear sets. Torque delivered into the second planetary gear set 52 from the ring gear 89 for the first planetary gear set is additive or combines with the torque from sun gear 66 for the second planetary set and is transferred to the ring gear 78 of the third planetary gear set. Torque delivered into the ring gear 89 is transferred to the sun gear 91 which is connected to the rotatable housing assembly 57. Resultant torque delivered to the ring gear 78 and sun gear 67 of the third planetary gear set 53 are again transferred to the transmission output shaft 54.

When the transmission is shifted from the third speed to fourth speed forward, the brake 34 is disengaged and the second input clutch 33 is brought into engagement together with the first input clutch 32. Under these conditions, input torque is delivered through the first and second intermediate shafts 61 and 62 to the sun gear 66 and 67 as well as the carrier assembly 82 and ring gear 78 of the third planetary gear set.

Under these conditions, the ring gear 78 is caused to rotate directly with the second intermediate shaft 62 while the sun gear 67 is rotating with the first intermediate shaft 61. Since both of the shafts 61 and 62 are coupled with the transmission shaft 17, the sun gear 67 and ring gear 78 are driven at the same speed as the transmission input shaft 17. Accordingly, the carrier assembly 76 for the third planetary gear set is also driven at the same speed as the transmission shaft 17 with a direct drive coupling being established for the transmission output shaft 54.

As the transmission is shifted into the higher speeds fifth gear forward and sixth gear forward, it may be seen that the second input clutch 33 remains engaged. The interconnection between components of the transmission speed ratio 13 causes overdrive gear ratios to be established, for example, when the brake is engaged in fifth gear forward and the brake 36 is engaged in sixth gear forward.

As for operation of the balance mechanism within the input clutch assembly 12, it is noted again that one or the other of the balance mechanisms assists in preventing undesired actuation for one of the input clutches 32 and 33 when only the other input clutch is to be engaged. For example, referring again to FIG. 4 and FIG. 2, it may be seen that both of the input clutches 32 and 33 are engaged in fourth gear forward. However, when the transmission is shifted into fifth gear forward, only the second input clutch 33 remains engaged. Since the housing assembly 57 is rotating, centrifugal force tends to develop within the actuating chamber 127 for the first input clutch 32. Normally, such centrifugal force would also tend to urge the first input clutch 32 into engagement with a possibility of interfering with the desired mode of operation for the transmission. To resist such actuation of the first clutch 32, increased actuating pressurization within the chamber 137 is transferred through the secondary piston 139 and the pins 142 to the main piston 126. Thus, the main piston 126 tends to be urged leftwardly against centrifugal force developed within the actuating chamber 127.

Interaction of the secondary piston 138 with the main piston 136 through the pins 141 similarly tends to present undesired engagement of the second input clutch 33. However, in fourth gear forward when both clutches are to be engaged, both of the secondary pistons 138 and 139 are urged further into their respective actuating chambers 127 and 137 because of the substantially greater force developed upon the opposing main pistons 136 and 126.

It may also be seen from FIG. 4 that the size of the two main pistons 126 and 136 are substantially the same yet having different inside diameters. However, the outside diameter for the secondary piston 139 is slightly greater than the outside diameter for the other secondary piston 138. This feature serves to assure proper operating sequence for the two input clutches 32 and 33 particularly as the transmission is shifted into and out of the fourth gear forward condition where both clutches are engaged.

What is claimed is:

1. A transmission comprising
an input shaft,
an output shaft,
first, second and third planetary gear sets each including a sun gear, a ring gear and intermeshing planetary gear means rotatably supported by a carrier, the ring gears of the first and second planetary gear sets being secured for rotation with each other, the ring gear of the third planetary gear set being secured for rotation with the carrier of the second planetary gear set, the carrier of the third planetary gear set being coupled with the output shaft, the input shaft being coupled with the sun gear of the first planetary gear set,
first and second intermediate shafts being arranged in concentric relation with the planetary gear sets, the first intermediate shaft being coupled with the sun gears of the second and third planetary gear sets, the second intermediate shaft being coupled with the carrier of the second planetary gear set and the ring gear of the third planetary gear set, a first friction device comprising a clutch being selectively actuatable in order to couple the first intermediate shaft for rotation with the input shaft, a second friction device comprising a clutch being selectively actuatable in order to couple the second intermediate shaft for rotation with the input shaft, a third friction device comprising a brake being selectively actuatable for securing the carrier of the first planetary gear set against rotation, a fourth friction device comprising a brake being selectively actuatable for securing the ring gears of the first and second planetary gear sets against rotation, a fifth friction device comprising a brake being selectively actuatable for securing the ring gear of the third planetary gear set against rotation, and means for selectively actuating each of the first, second, third, fourth and fifth friction devices.

2. The transmission of claim 1 wherein the second and third planetary gear sets are simple planetary gear units, the first planetary gear set being a compound planetary gear unit having compound intermeshing planetary gear means rotatably supported by a common carrier, the third friction device being selectively actuatable for securing the common carrier against rotation.

3. The transmission of claim 1 further comprising a torque converter providing a fluid coupling for the input shaft with a prime mover.

4. The transmission of claim 1 wherein the first and second friction devices are responsive to pressurization of respective associated actuating chambers for coupled engagement with the respective intermediate shafts, and interconnecting means responsive to pressurization of each of the respective actuating chambers for resisting engagement of the friction device associated with the other actuating chamber.

5. The transmission of claim 4 wherein each interconnecting means comprises a piston means arranged in each actuating chamber and a coupling means coupling the piston means with the other friction device.

* * * * *